(12) United States Patent
Dynok et al.

(10) Patent No.: US 7,565,187 B1
(45) Date of Patent: Jul. 21, 2009

(54) TRANSCEIVER DEVICE AND FASTENER

(75) Inventors: Michael R. Dynok, Malden, MA (US);
Vincent Palermo, Westford, MA (US);
Charles M. Marshall, N. Andover, MA
(US); Timothy E. White, Acton, MA
(US)

(73) Assignee: Radeum, Inc., Orem, UT (US)

( * ) Notice: Subject to any disclaimer, the term of this patent is extended or adjusted under 35 U.S.C. 154(b) by 834 days.

(21) Appl. No.: 10/413,434

(22) Filed: Apr. 11, 2003

Related U.S. Application Data

(60) Provisional application No. 60/372,357, filed on Apr. 11, 2002, provisional application No. 60/371,985, filed on Apr. 11, 2002, provisional application No. 60/452,045, filed on Mar. 4, 2003.

(51) Int. Cl.
*H04M 1/00* (2006.01)

(52) U.S. Cl. .................. 455/575.6; 455/557; 455/575.2

(58) Field of Classification Search .................. 455/557, 455/575.1, 575.2, 575.6
See application file for complete search history.

(56) References Cited

U.S. PATENT DOCUMENTS

| | | | | |
|---|---|---|---|---|
| 5,551,065 A * | 8/1996 | Honore | ....................... | 455/66.1 |
| 5,590,417 A | 12/1996 | Rydbeck | | |
| 5,913,163 A * | 6/1999 | Johansson | ................. | 455/426.1 |
| 5,982,904 A | 11/1999 | Eghtesadi et al. | | |
| 6,006,115 A * | 12/1999 | Wingate | ................... | 455/575.2 |
| 6,078,825 A | 6/2000 | Hahn et al. | | |
| 6,208,445 B1 * | 3/2001 | Reime | ......................... | 398/106 |
| 6,230,029 B1 | 5/2001 | Hahn et al. | | |
| 6,317,039 B1 * | 11/2001 | Thomason | ................... | 340/505 |
| 6,473,630 B1 | 10/2002 | Baranowski et al. | | |
| 6,978,163 B2 * | 12/2005 | Dyer et al. | ............... | 455/575.2 |
| 6,987,988 B2 * | 1/2006 | Uchiyama | .................... | 455/557 |
| 7,110,798 B2 * | 9/2006 | Nassimi | .................... | 455/575.2 |
| 7,130,608 B2 * | 10/2006 | Hollstrom et al. | ........... | 455/403 |
| 7,215,924 B2 * | 5/2007 | Palermo et al. | ............. | 455/41.1 |
| 2002/0068610 A1 * | 6/2002 | Anvekar et al. | ............. | 455/560 |
| 2003/0134667 A1 * | 7/2003 | Chung | ......................... | 455/569 |
| 2004/0102227 A1 * | 5/2004 | Schlegel | .................. | 455/569.1 |

* cited by examiner

*Primary Examiner*—Simon Sing
(74) *Attorney, Agent, or Firm*—Jefferson IP Law, LLP; Raymond B. Persino

(57) ABSTRACT

An apparatus for portable communications including a wireless headset, attachment that mechanically and electrically connects to a cellular phone or other electronic device, and a base unit that includes an attachment interface to connect mechanically and electrically with the attachment to allow the base unit to receive electrical signals from the cellular phone. The base unit wirelessly transmits a representation of an electrical signals received from the cellular phone to the wireless headset. The apparatus may also include a clip to attach the integrated base unit to an article of clothing, such as a belt, worn by a person.

23 Claims, 8 Drawing Sheets

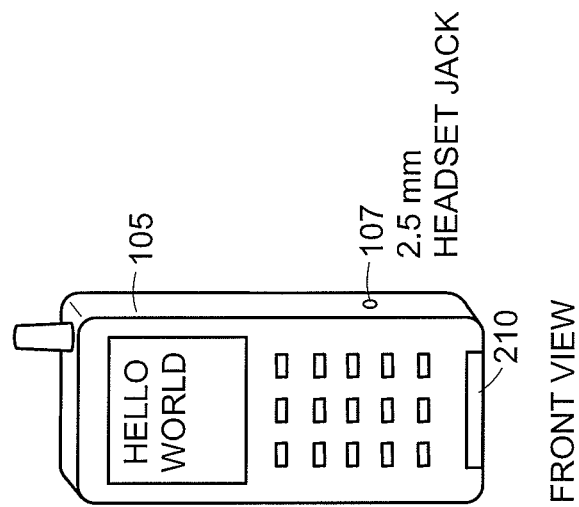
FIG. 5C FRONT VIEW
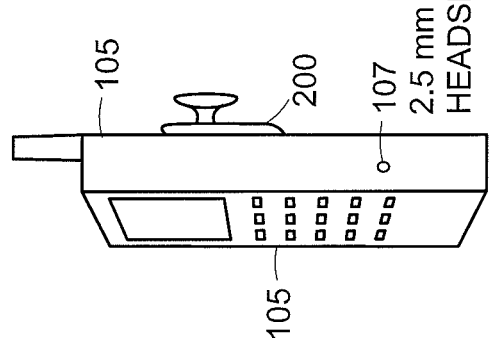
FIG. 5B SIDE VIEW
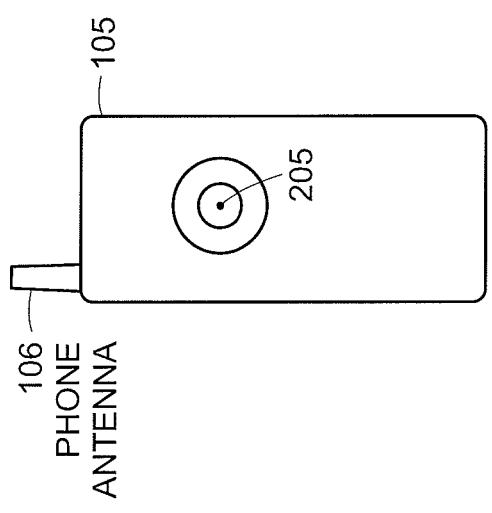
FIG. 5A BACK VIEW

TRANSCEIVER DEVICE AND FASTENER

RELATED APPLICATION(S)

This application claims the benefit of U.S. Provisional Application No. 60/372,357, filed Apr. 11, 2002, U.S. Provisional Application No. 60/371,985, filed Apr. 11, 2002, and U.S. Provisional Application No. 60/452,045 filed Mar. 4, 2003. The entire teachings of the above applications are incorporated herein by reference.

BACKGROUND OF THE INVENTION

Considerable advantage and convenience can be realized to users of mobile phones and portable electronic devices if these products can be used "hands free". A typical solution to hands free operation today is a wired headset, consisting of a speaker mounted in or in close proximity to the ear and a microphone typically located on a wire connecting the speaker to the mobile phone. The headset wire may plug into a standard 2.5 millimeter or stereo audio jack located on the side of the phone or into another type of connector typically located on the bottom of the phone. However, the use of a wire is often inconvenient because it restricts freedom of motion, either because of the length of the wire or interference with motion of the hands or arms. In a vehicle, the wire frequently interferes with release of the seat belt or may become tangled with the seat belt other car fixtures.

One method of eliminating the wire is through use of a wireless headset. A wireless headset may include a headset containing a speaker and microphone, such as described in U.S. Provisional Application No. 60/520,285 for In the Ear Headset. This wireless headset communicates with a base unit, which can be attached to the bottom of the mobile phone. Alternatively, the base unit may be attached to the phone through a short wire that plugs into the base of the phone or onto the standard 2.5 mm jack found on many mobile phones. It would thus be advantageous if the headset, phone, and base devices could be mated in an assembly that provides greater ease of use.

SUMMARY OF THE INVENTION

Accordingly, in a first embodiment, an apparatus for portable communications includes (i) a first portable electronic device, such as a headset or audio headphones, that includes a wireless transceiver, (ii) an attachment that mechanically and electrically connects to a second portable electronic device, such as a cellular phone, and (iii) a base unit that includes (a) an attachment interface adapted to connect with the attachment and receive electrical signals of the second portable device and (b) a wireless transceiver to transmit a representation of the electrical signals to the first portable electronic device.

The second portable electronic device may also be a mobile phone, MP3 Player, personal digital assistant (PDA), portable computer, printer, point-of-sale terminal, CD player, or other personal audio device. The electrical signals may be digital representations of audible sounds.

In one embodiment, the wireless transceivers communicate through magnetic induction. Alternatively, the communication may use an RF standard such as BlueTooth®.

The attachment interface in the base unit may automatically make an electrical connection with the second wireless electronic device.

The attachment interface may include a U-shaped notch with optional release mechanism. The attachment interface may further include a pivot or spring to pivot or rotate the second portable electronic device. The attachment, attachment interface, or both may include an electrical connector to enable the second portable electronic device to pivot or rotate relative to the base unit and maintain electrical connection.

The base unit may also include a docking interface to dock the first portable electronic device. Additionally, the base unit may include a battery charger to charge a battery associated with the first portable electronic device. The base unit may receive power from the second portable electronic device. The base unit may also include a clip to allow a user to attach the base unit to an article of clothing. The clip may be a removable belt clip.

The base unit may be a holster design for docking both the first and second portable electronic devices.

In a second embodiment, the apparatus for portable communications includes a first portable electronic device, having a wireless transceiver, and a base unit. The base unit includes two docking interfaces—one for the first portable electronic device and one for a second portable electronic device. The base unit also includes a connector adapted to receive electrical signals of the second portable device and a wireless transceiver to transmit the electrical signals to the first portable electronic device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a series of views depicting a mechanical connector optionally used to connect a cellular phone to the integrated base unit of FIG. 3;

DETAILED DESCRIPTION OF THE INVENTION

A description of preferred embodiments of the invention follows.

One current method of attaching a integrated base unit to a mobile phone is through a wired dongle consisting of an integrated base unit and wire with a 2.5 mm jack. The base unit consists of a transceiver that enables wireless communication from a cell phone to another wireless device, such as a headset. A wire connects the base unit to the phone, for example, through a 2.5 mm headset jack on the phone. In one instance, the user may attach both the base unit and the mobile phone to his belt using a belt clip, with the two devices interconnected through a wire. However, this implementation is inconvenient for several reasons. For example, the user has two devices on his belt when he may prefer just one device. In addition, to remove the phone from the belt clip requires either removing both the phone and base unit, or disconnecting the two devices. Finally, when storing both devices, it is inconvenient to have to handle two devices, whether or not they are connected.

Figure 1:
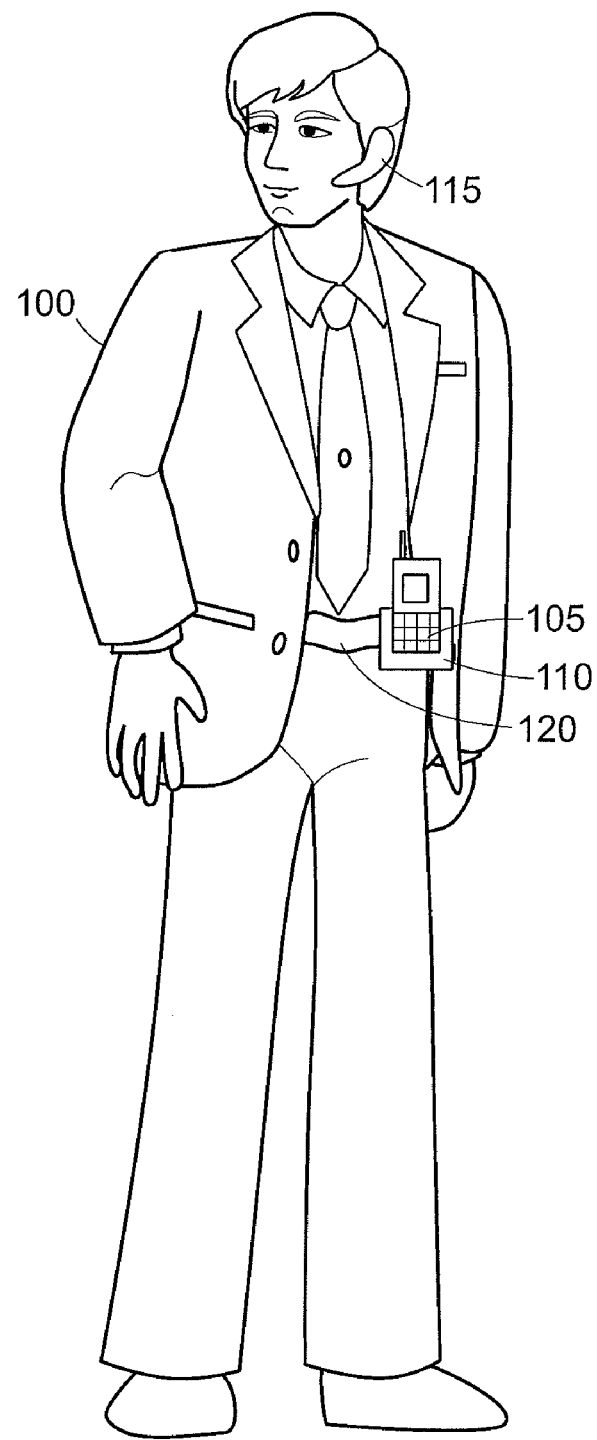
FIG. 1 is an illustration of a person employing the transceiver device and fastener according to the principles of the present invention.

FIG. 1 illustrates a new concept for attaching a mobile phone 105 and integrated base unit 110 as conceived according to certain principles of the present invention. The mobile phone 105 may be attached to the integrated base unit 110 that incorporates both a wireless transceiver (not shown) and a belt clip (see FIG. 2). The integrated base unit 110 is thus clipped to a belt 120 of a user 100, and the mobile phone 105 is then attached to or "hung" on the integrated base unit 110. In this manner, just a single device is attached to the belt 110 of the user 100 rather than two separate devices. The integrated base unit 110 then communicates to a headset 115.

Figure 2:
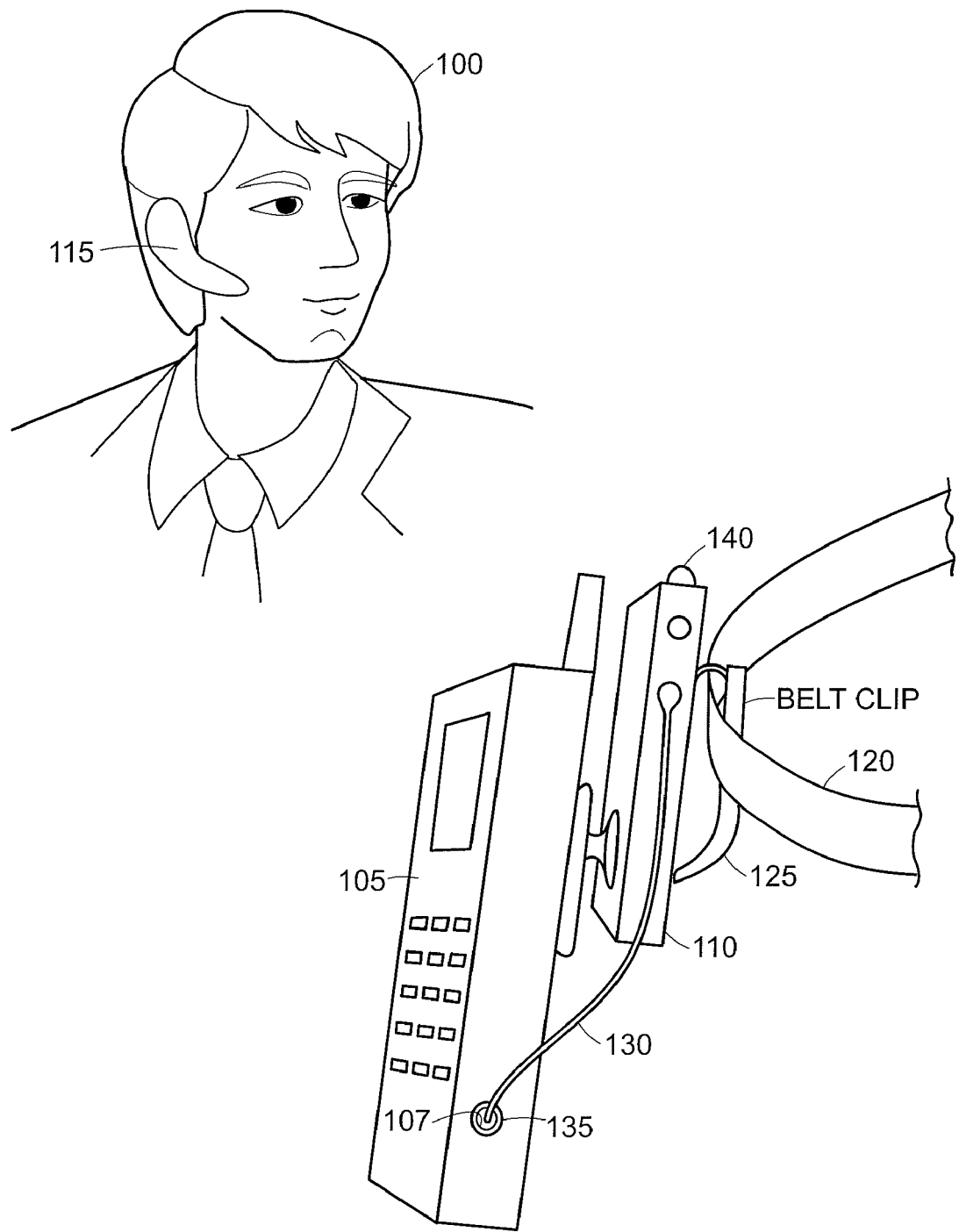
FIG. 2 is a diagram of an example embodiment of the transceiver device and fastener of FIG. 1.

FIG. 2 shows certain details for one embodiment of the present invention. The mobile phone 105 is attached to the integrated base unit 110 (or just base unit 110) with an integral belt clip 125. A wire 130 connects the integrated base unit 110 to the phone 105 to pass audio information from the phone 105 to the integrated base unit 110 for transmission to the headset 115 and, in at least one embodiment, for passing audio information received by the integrated base unit 110 back to the phone 105. The integrated base unit 110 may include a release mechanism 140 to detach the phone 105 from the integrated base unit 110.

Figure 3:
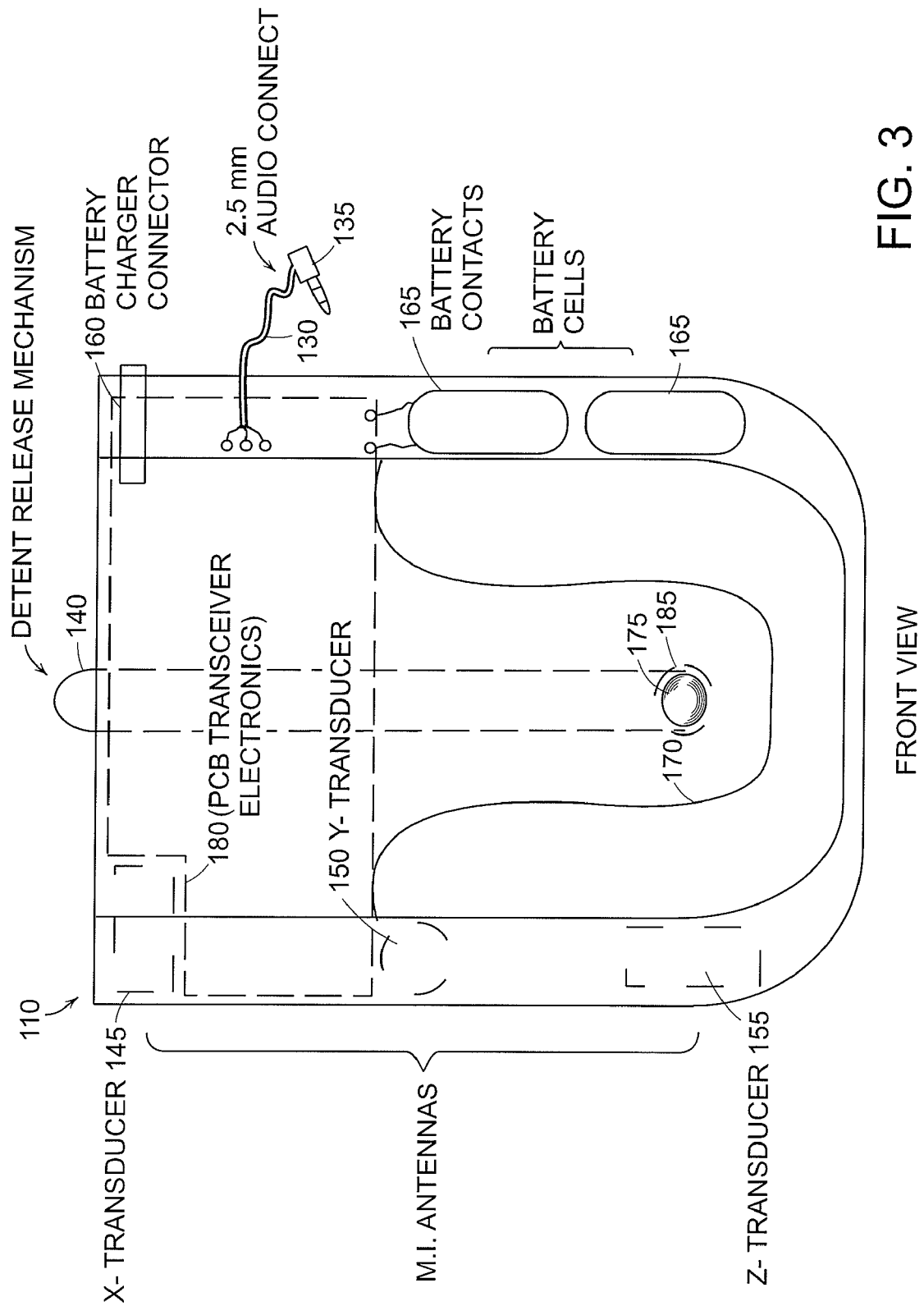
FIG. 3 is a mechanical diagram of an integrated base unit used in the transceiver device of FIG. 1.

FIG. 3 shows a front view of one embodiment of the integrated base unit 110, oriented as it would hang on the belt 120 of the user 100. On the face of the integrated base unit 110 is a U-shaped notch 170 into which a mushroom shaped knob 175, attached to the back of mobile phone 105, is inserted. The U-shaped notch 170 may contain a (i) detent 185, to receive a mating component attached to the mobile phone 105, or (ii) other mechanical features, such as a raised nub 175, to insert into a detent attached to the mobile phone 105, to ensure that the phone does not inadvertently become dislodged from the U-shaped notch 170. The integrated base unit 110 may also include the release mechanism 140 (note: in FIGS. 3, 140 and 180 need to be swapped) to cause the mobile phone 105 to be released from the detent 185 when actuated by the user 100.

As it is advantageous to minimize the size of the integrated base unit 110, subassemblies internal to the integrated base unit 110 may be located in certain locations in order to minimize size. For example, the embodiment in FIG. 3 shows the location of components for a magnetic induction wireless communications system internal to a plastic housing of the integrated base unit 110. The integrated base unit 110 may include three orthogonally located transducers 145, 150, and 155 positioned to one side of the U-shaped notch 170 and two rechargeable battery cells 165 to the other side of the U-shaped notch 170. A printed circuit board 180 containing the remaining transducer electrical components may be located above the U-shaped notch 170. The integrated base unit 110 may include a connector 160 for charging of the batteries 165, and the wire 130 with the connector 135 that inserts into the 2.5 mm jack of a mobile phone 105.

Figure 4:
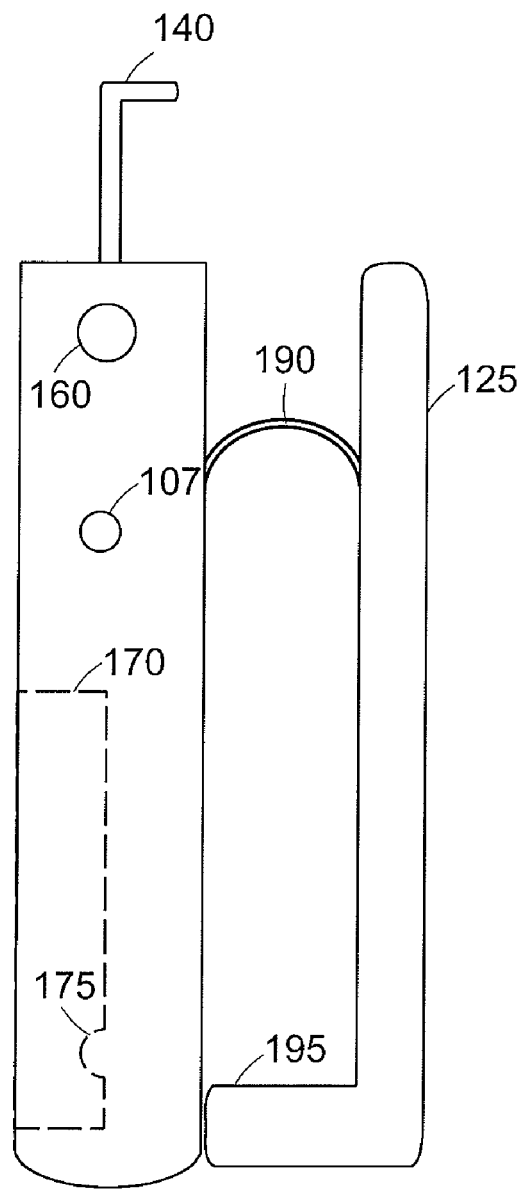
FIG. 4 is a side view of the transceiver device and fastener of FIG. 1.

FIG. 4 shows a side view of the same embodiment. The belt clip 125 for attaching to the belt 120 of the user 100 is provided on the back of the integrated base unit 110, optionally on the opposite face from the U-shaped notch 170. A spring pivot 190 enables the base 195 of the belt clip 125 to be pulled away from the back of the integrated base unit 110 to enable the belt 120 to be inserted into the clip 125.

There are many different belt clip designs and knob attachments for mobile phones 110 that are well known to those skilled in the art, many of which can be used as part of this invention. In this embodiment, the release button 140 is provided on the top of the integrated base unit 110 to enable the mobile phone 110 to be removed from the integrated base unit 110 while the integrated base unit 110 remains attached to the belt 120 by the belt clip 125.

In another embodiment, the phone 105 and integrated base unit 110 remain attached, and the release button 140 enables the belt clip 125 to be removed from the remainder of the integrated base unit 110. Removal of the belt clip 125 enables the integrated base unit 110, with or without the phone 105 attached, to be removed from the belt 120 while leaving the belt clip 125 attached to the belt 120. In this manner, the phone 105 and integrated base unit 105 can remain as an integrated unit such that there is no need to unplug the 2.5 mm plug 135 from the phone 105 when removing the phone 105 from the belt 120.

FIG. 5 shows the mobile phone 105 with the mushroom shaped knob 220 provided on its back face. The knob 200 (i.e., attachment) may be permanently built into the phone 105 or attached as an aftermarket product that is "glued", uses Velcro®, or otherwise attached to a surface of the phone 105. The knob 200 is shaped such that it fits within the U-shaped notch 170 of the integrated base unit 110. A round shape for the mushroom shaped knob 200 is advantageous because it allows rotation of the phone 105, for example, to enable the phone 105 to move in position relative to the integrated base unit 110 when the user 100 is sitting or standing upright. There are many such knobs 200 and belt clips 125 available on the market today to enable a phone 110 to be attached to a belt clip 125. Many of these designs can be used or be modified for use with this design by those skilled in the art, and no particular design is a necessary feature of this invention. In another embodiment, the phone attachment 200 may be rectangular in shape with a reduced profile that enables the phone 105 to be located in closer proximity to the integrated base unit 110. The rectangular phone attachment may slide into a channel in the integrated base unit 110. This would be advantageous to prevent rotation of the phone 110 with respect to the integrated base unit 110. Other shapes may also be used to provide a method of attachment between the phone and integrated base.

At the center of the knob 200 may be a detent 205 that receives a nub 175 (FIG. 3) in the U-shaped notch 170 to help ensure that the phone 105 remains in the U-shaped notch 170 throughout the movements of the user 100.

In another embodiment of the design, the belt clip 125 can be made as part of the integrated base unit 110 and thus is not removable. This may be advantageous because of smaller size, lower cost and simplicity of operation.

In another embodiment, the 2.5 mm plug 135 (FIG. 2) may be a connector for attachment to a different mating connector 210 located on the mobile phone 105, such as is frequently located on the base of the phone 105.

In another embodiment of the design, the integrated base unit 110 may be powered from the phone 105, thereby eliminating the need for batteries 165 in the integrated base unit 110. In this embodiment, the interconnect from the phone 105 to the integrated base unit 110 includes a power connection. In another embodiment, the phone power may be used to recharge the batteries 165 contained in the integrated base unit 110.

In another embodiment of the invention, the integrated base unit 110 is charged concurrently with the phone 105 using a phone charger (not shown). In this embodiment, there is no need for a separate charging connector 160 (FIG. 3) on the integrated base unit 110, and the electrical connection from phone 105 to integrated base unit 110 includes a charging connection. In one such embodiment, the connector subassembly (i.e., plug 135) on the wire 130 from the integrated base unit 110 to the phone 110 attaches to the connector 210 at the base of the phone 105, and the phone charger (not shown) plugs into that connector subassembly. The connector subassembly then distributes power (i) to the phone 105 to charge the phone 105 and (ii) to the integrated base unit 110 to charge the integrated base unit 110. In a similar embodiment, the phone charger connects to the integrated base unit 110, and the integrated base unit 110 then distributes and passes the charger current through a cable (not shown) to the phone 105. This is advantageous in reducing the size of the connector to the phone 105 while maintaining a single charger for use with the phone 105, integrated base unit 110, or both, simultaneously.

In another embodiment, the mechanical connection that enables the phone 105 to be hung from the integrated base unit 110 also includes an electrical connection that enables audio information to be passed between the two devices 105, 110. One advantage of this embodiment is that no separate wire connection is required. Both electrical and mechanical connections are made simultaneously. When the user 100 removes the phone 105 from the integrated base unit 110, there is no separate wire 130 to disconnect. If the user 100 desires to maintain the electrical connection when removing the phone 105 from the belt 120, then both phone 105 and integrated base unit 110 can be removed by disconnecting them from the belt clip 125.

Figure 6:
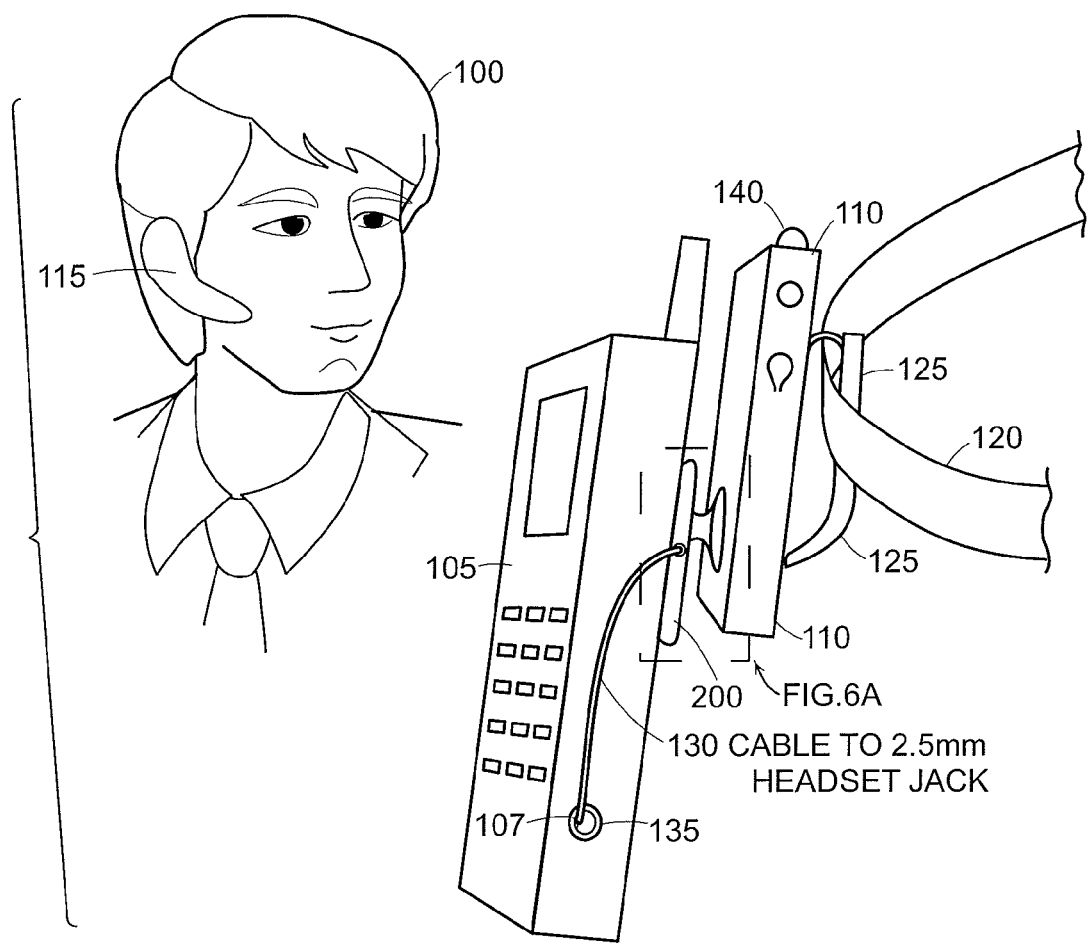
FIGS. 6 and 6A are mechanical diagrams of the mechanical connector of FIG. 5 having ring contacts.
Figure 6A:
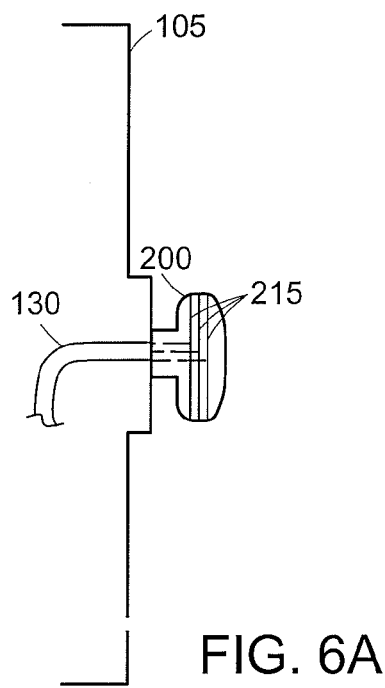

In the embodiment of FIGS. 6 and 6A, the wire 130, attached throughout its length to the side of the phone 105, connects the 2.5 mm headset jack 107 on the phone 105 to the knob 200. The integrated base unit connects electrically to the phone 105 through electrical contacts (not shown) contained in the U-shaped notch 170. The mushroom shaped knob 200 thus contains matching electrical contacts 215, thereby enabling an electrical connection to be made whenever the user 100 inserts the mobile phone 105 into the integrated base unit 110. Thus, there is no need for the wire 130 and 2.5 mm plug 135 to connect directly from the phone 105 to the integrated base unit 110.

Electrical connection from the phone 105 to the mushroom shaped knob 200 may be achieved by a variety of means. Alternatively, a wired attachment may be made to alternative connectors or contacts on the phone 105, or the phone 105 can be manufactured with an integral knob as part of the phone 105, and the electrical connection 15 therefore made internal to the phone 105.

Continuing with the embodiment of FIGS. 6 and 6A, the U-shaped notch 170 contains three spring contacts (not shown) located on the bottom of notch 170. The knob 200 contains three circular or ring contacts 215 that are placed around the entire circumference of the knob 200. The three ring contacts 215 provide for an electrical ground, audio input, and audio output. More or fewer contacts may be required depending on the application, the type of electrical devices being used with integrated base unit 110 and the number of signals to be passed between devices. In another embodiment, audio signals, ground, power and digital signals such as RS-232 may be connected between the devices. The electrical signals can be further used to indicate to the phone that the user intends to use the phone in the conventional way. For example, while electrical contact is made, the phone is signaled by the base electronics to operate in headset mode. In this mode the phone's earpiece and microphone are disabled. When the devices are detached from each other, the lack of electrical signals between the phone and the base indicate to the phone to switch on its earpiece and microphone since the user no longer desires to use the headset. Continuing with this embodiment, when the phone 105 is inserted into the U-shaped notch 170, the spring contacts (not shown) make electrical contact with the ring contacts 215 on the knob 200. It is advantageous to have ring, slip, or other rotatable contacts to enable the phone 105 to move relative the integrated base unit 110, as required, to enable the phone position to accommodate various movements of the user 100. However, non-rotating contacts and a fixed relative position of the devices may also be used as an alternative embodiment of this invention.

It should be understood that this invention is not dependent on any particular wireless technology. For example, alternative technologies such as RF and Bluetooth® may be used instead of magnetic induction. Any wireless technology that requires or allows for a base transceiver to be connected to the phone 105 is encompassed by this invention.

It should also be understood that this invention is applicable to devices other than mobile phones 105. Any personal electronic devices, such as PDAs, MP3 players, portable computers, printers, point of sale terminals, CD players and other personal audio devices may also benefit from this invention. In one embodiment, an MP3 player may be hung from the integrated base unit 110 in the same manner as the cell phone 105, and stereo audio music wirelessly transmitted from the integrated base unit 110 to a stereo headset.

Figure 7:
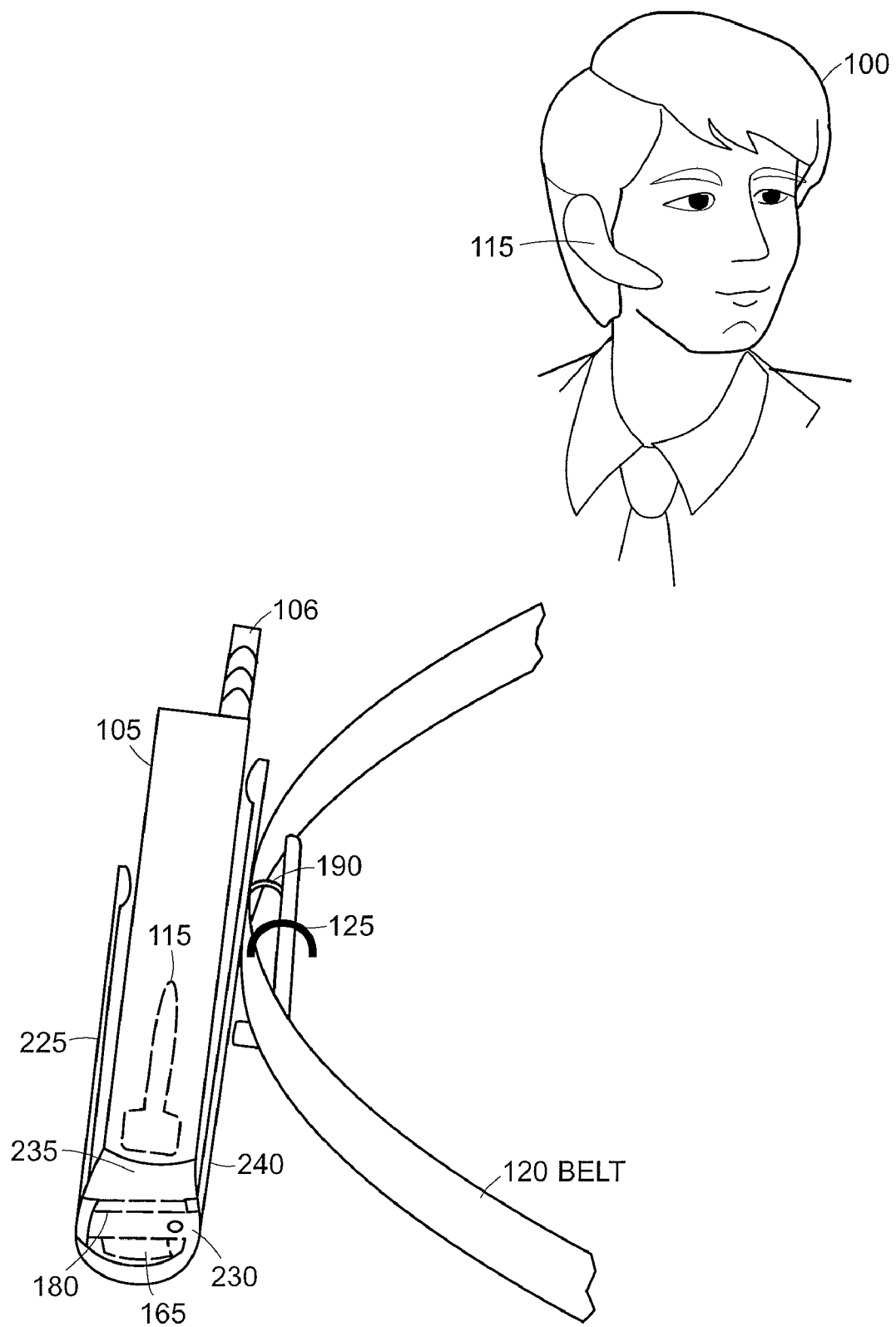
FIG. 7 is a diagram of a holster embodiment of the integrated base unit of FIG. 3.

Other features and capabilities may also be incorporated into the integrated base unit 110. For example, the integrated base unit 110 may contain a primary cell battery, a GPS receiver, additional memory for an MP3 player, a codec, status displays, LEDs, or other such functions and features that would augment the performance of the integrated base unit 110 or electronic device hung from the integrated base unit 110. FIG. 7 shows an embodiment according to certain principles of the present invention. A method of attaching the phone 105 to the belt 125 is accomplished through a "holster" 225. In the holster 225, a phone 105 is dropped into a holster-like carrying case worn on the belt 120. The holster 225 may be designed to conform to the shape of a specific make or type of phone 105.

The holster 225 may be made at least in part of plastic or other similar material, and may also be designed to include an integrated base transceiver 230 using the principles of the present invention as described previously. In such a system, the U-shaped notch 170 of the integrated base unit 110 and mushroom shaped knob 200 on the back of the phone 105 may not be required. The integrated base transceiver 230 may be designed into the holster 225 at the bottom of the holster 225 or other such location to provide the desired form factor and size.

Electrical connection from the phone 105 to the integrated base unit 110 may be made by a connector 235 in the holster 225 to connect the base of the phone 105. In this manner, when the phone 105 is placed into the holster 225, a connection to the integrated base unit 110 is provided without the connection of wires (e.g., wire 130) by the user 100. Alternatively, the method described previously in FIGS. 6 and 6A may be used to mechanically and electrically attach the phone 105 to the holster 225. According to the principles of the present invention as previously discussed, a battery 165 may be included in the holster 225, or the holster transceiver 230 may be powered directly from the phone 105 through the base connector 235.

In another embodiment of this design, a location for the headset 115 may also be provided in the holster 225 such that the headset 115 may also be inserted into the holster 225 and connected through a second connector 240 to the integrated base unit 110, thereby enabling charging of a battery (not shown) in the headset 115 from a voltage provided by the integrated base unit 110 or by the phone 105.

The combination of mechanical and electrical interfaces for mechanically and electrically connecting the phone 105 or headset 115 to the base unit 110 or holster 225 may be referred to as a "docking" interface. When the electronic device(s) 105 and 115 are docked, they are mechanically and electrically connected to the base unit 110 or holster 225 and capable of uni- or bi-directional communications with the base unit 110 or holster 225. It should be understood that the docking interface(s) may include mechanical and electrical connectors discussed above or others suitable for accomplishing the same or similar functions.

Figure 8:
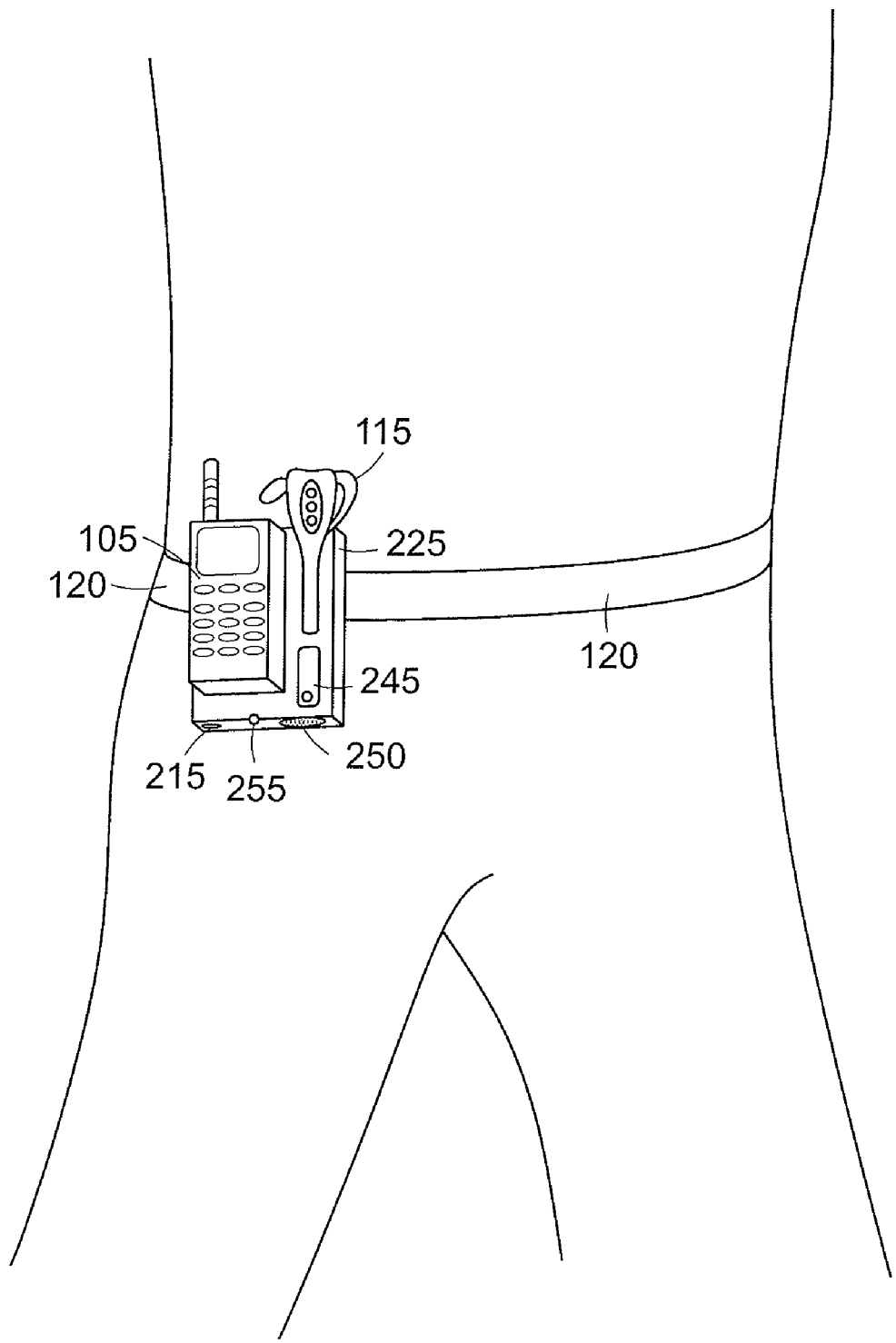
FIG. 8 is a front view of the holster embodiment of FIG. 7.

FIG. 8 is an illustration of the user 100 employing the holster 225. The phone 105 and headset 115 are mechanically attached to the holster 225. Either or both may be charged by batteries hidden behind a battery cover 245 in the holster 225 through connectors (not shown) similar to those discussed above. The holster 225 may also include other connectors, such as a connector 215 to receive power through a cable to a car cigarette light socket. Hands-free features may also be provided, such as through deployment of a speaker 250 and microphone 255. The connector 235 (FIG. 7) to the bottom connector or 2.5 mm jack of the phone 105 allows for these hands-free features.

The present system and methods can be used in conjunction with wireless communication systems such as that described in U.S. application Ser. No. 10/100,229 filed on Mar. 15, 2002, U.S. application Ser. No. 10/004,989 filed on Dec. 3, 2001, U.S. application Ser. No. 09/942,372 filed on Aug. 29, 2001, U.S. Provisional Application No. 60/301,529 filed on Jun. 28, 2001, U.S. Provisional Application No. 60/296,229 filed on Jun. 6, 2001, and U.S. Provisional Application No. 60/276,398 filed on Mar. 16, 2001. The entire teachings of the above application(s) are incorporated herein by reference.

While this invention has been particularly shown and described with references to preferred embodiments thereof, it will be understood by those skilled in the art that various changes in form and details may be made therein without departing from the scope of the invention encompassed by the appended claims.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus for portable communications, the apparatus comprising:
    a first portable electronic device including a first wireless transceiver;
    an attachment comprising a rigid coupling adapted to fixedly attach to a second portable electronic device and an electrical coupling adapted to electrically couple to the second portable electronic device; and
    a base unit including:
        an attachment interface adapted to mechanically retain the rigid coupling of the attachment and electrically couple to the attachment to receive electrical signals of the second portable device when the electrical coupling of the attachment is electrically coupled to the second portable electronic device and the rigid coupling of the attachment is mechanically retained by the attachment interface; and
        a second wireless transceiver to transmit a representation of the electrical signals to the first portable electronic device.

2. An apparatus as in claim 1 wherein the second portable electronic device comprises at least one of a mobile phone, an MP3 Player, a personal digital assistant (PDA), a portable computer, a printer, a point-of-sale terminal, a CD player, and a personal audio device.

3. An apparatus as in claim 1 wherein the first portable electronic device comprises at least one of a headset and audio headphones.

4. An apparatus as in claim 1 wherein the electrical signals are digital representations of audible sounds.

5. An apparatus as in claim 1 wherein the wireless transceivers communicate through magnetic induction.

6. An apparatus as in claim 1 further including a wire adapted to interconnect the attachment to at least one of a voice and audio jack on the second portable electronic device.

7. An apparatus as in claim 1 wherein the interface forms a U-shaped notch and includes a release mechanism.

8. An apparatus as in claim 1 wherein at least one of the attachment and attachment interface include an electrical connector to enable at least one of pivoting and rotating of the second portable electronic device relative to the base unit and maintain electrical communication between the second portable electronic device and the base unit.

9. An apparatus as in claim 1 further including a second attachment to at least one of pivot and rotate the second portable electronic device, the second attachment including an electrical connector to enable the second portable electronic device to at least one of pivot and rotate relative to the base unit and maintain electrical connection.

10. An apparatus as in claim 1 wherein the base unit further includes a docking interface to couple mechanically and electrically the first portable electronic device to the base unit.

11. An apparatus as in claim 10 wherein the base unit further includes a battery charger to charge a battery associated with the first portable electronic device.

12. An apparatus as in claim 1 wherein the base unit receives power from the second portable electronic device.

13. An apparatus as in claim 1 wherein the base unit includes a clip to attach the base unit to an article of clothing.

14. An apparatus as in claim 13 wherein the clip comprises a belt clip.

15. An apparatus as in claim 1 wherein the base unit comprises a holster design for docking both the first and second portable electronic devices.

16. An apparatus for portable communications, the apparatus comprising:
    a first portable electronic device including a first wireless transceiver;
    a second portable electronic device including an attachment, the attachment comprising a rigid coupling integral to the second portable electronic device and an electrical coupling adapted to electrically couple to the second portable electronic device; and
    a base unit including:
        an attachment interface adapted to mechanically retain the rigid coupling of the attachment and electrically couple to the attachment to receive electrical signals of the second portable electronic device when the electrical coupling of the attachment is electrically coupled to the second portable electronic device and the rigid coupling of the attachment is mechanically retained by the attachment interface; and a second wireless transceiver to transmit a representation of the electrical signals to the first portable electronic device.

17. An apparatus as in claim 16 wherein the base unit further includes another interface to dock the first portable electronic device.

18. An apparatus as in claim 17 wherein the base unit further includes a battery charger to charge a battery associated with the first portable electronic device.

19. An apparatus as in claim 16 further including a wire adapted to interconnect the base unit to a voice or audio jack on the second portable electronic device.

20. An apparatus as in claim 16 wherein the attachment interface automatically makes an electrical connection between the base unit and the second wireless electronic device.

21. An apparatus as in claim 16 wherein the base unit further includes a pivot to enable the second portable electronic device to at least one of pivot and rotate relative to the base unit and maintain electrical connection.

22. An apparatus for portable communications, the apparatus comprising:

a first portable electronic device including a wireless transceiver;

attachment means comprising a rigid coupling means for fixedly attaching to a second portable electronic device and an electrical coupling means for electrically coupling to the second portable electronic device; and a base unit including:

an attachment interface means for mechanically retaining the rigid coupling means of the attachment means and for electrically coupling to the attachment means for receiving electrical signals of the second portable device when the electrical coupling means of the attachment means is electrically coupled to the second portable electronic device and the rigid coupling means of the attachment means is mechanically retained by the attachment interface means; and means for wirelessly transmitting a representation of the electrical signals to the first portable electronic device.

23. An apparatus as in claim 22 further including means for attaching the base unit to an article of clothing worn by a person.

* * * * *